US011328401B2

(12) United States Patent
Lu et al.

(10) Patent No.: US 11,328,401 B2
(45) Date of Patent: May 10, 2022

(54) STATIONARY OBJECT DETECTING METHOD, APPARATUS AND ELECTRONIC DEVICE

(71) Applicant: APOLLO INTELLIGENT DRIVING TECHNOLOGY (BEIJING) CO., LTD., Beijing (CN)

(72) Inventors: Weixin Lu, Beijing (CN); Shiyu Song, Sunnyvale, CA (US); Fangfang Dong, Beijing (CN); Shengpan Xu, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 58 days.

(21) Appl. No.: 16/517,782

(22) Filed: Jul. 22, 2019

(65) Prior Publication Data
US 2019/0340746 A1 Nov. 7, 2019

(30) Foreign Application Priority Data
Aug. 3, 2018 (CN) .......................... 201810880407.6

(51) Int. Cl.
*G06T 7/00* (2017.01)
*G06T 7/10* (2017.01)
(Continued)

(52) U.S. Cl.
CPC ............ *G06T 7/0002* (2013.01); *G06F 17/18* (2013.01); *G06K 9/6218* (2013.01);
(Continued)

(58) Field of Classification Search
CPC ....... G06T 7/0002; G06T 7/10; G06K 9/6218; G06K 9/6276; G06F 17/18
See application file for complete search history.

(56) References Cited

U.S. PATENT DOCUMENTS

| 9,798,950 B2 | 10/2017 | Nakashima et al. |
| 2013/0300740 A1* | 11/2013 | Snyder .................... G06F 3/016 345/420 |

(Continued)

FOREIGN PATENT DOCUMENTS

| CN | 104021586 A | 9/2014 |
| CN | 104599314 A | 5/2015 |

(Continued)

OTHER PUBLICATIONS

First Office Action issued in CN Application No. 201810880407.6; dated Jul. 18, 2019; 5 pages.

(Continued)

*Primary Examiner* — Ruiping Li
(74) *Attorney, Agent, or Firm* — Dilworth IP, LLC

(57) ABSTRACT

A stationary object detecting method, a stationary object apparatus, and an electronic device are disclosed in embodiments of the present disclosure, the method includes: obtaining point cloud data of a scene and feature information of each of data points in the point cloud data; performing a triangulation network connection on each of the data points in the point cloud data to generate a triangular network model, and taking a picture of the triangular network model using a preset camera to obtain an image; obtaining a first data point corresponding to each pixel point in the image, and obtaining a feature map of the point cloud data according to feature information of each first data point; inputting the feature map into a classification model to obtain data points corresponding to the stationary object in the point cloud data.

16 Claims, 10 Drawing Sheets

(51) Int. Cl.
*G06F 17/18* (2006.01)
*G06K 9/62* (2022.01)
(52) U.S. Cl.
CPC .............. *G06K 9/6276* (2013.01); *G06T 7/10* (2017.01); *G06T 2207/10028* (2013.01)

(56) References Cited

U.S. PATENT DOCUMENTS

2019/0065637 A1* 2/2019 Bogdoll ................. G06N 20/00
2019/0227175 A1* 7/2019 Steinberg ................ G01S 17/89

FOREIGN PATENT DOCUMENTS

| CN | 104902246 A | 9/2015 |
| CN | 104933755 A | 9/2015 |
| CN | 105184738 A | 12/2015 |
| CN | 106650809 A | 5/2017 |

OTHER PUBLICATIONS

Notice of Allowance issued in CN Application No. 201810880407.6 dated Oct. 24, 2019.

* cited by examiner

STATIONARY OBJECT DETECTING METHOD, APPARATUS AND ELECTRONIC DEVICE

CROSS-REFERENCE TO RELATED APPLICATIONS

This application claims priority to Chinese Patent Application No. 201810880407.6, filed on Aug. 3, 2018, which is hereby incorporated by reference in its entirety.

TECHNICAL FIELD

Embodiments of the present disclosure relate to the field of data processing technology, and particularly to a stationary object detecting method, a stationary object detecting apparatus and an electronic device.

BACKGROUND

A static map is a kind of presentation of a fixed object in a physical space, which describes a stationary ground object in a scene. When generating a static map, not only dynamic ground objects that are moving but also dynamic ground objects that are currently in a stationary state but may change in a relatively short period of time (for example, a car, an automatic vehicle or the like that is static in the current moment) should be removed. According to statistics with real data, stationary cars accounts for more than 75% of all stationary ground objects. Therefore, whether the stationary vehicles could be completely removed is one of key factors for evaluating the quality of a static map, which is also an important part in safe driving of driverless vehicles.

An existing method for detecting a stationary vehicle from point cloud data of a static map is bounding box detecting method, which specifically identifies the size and the orientation of a vehicle with an oriented bounding box. However, the existing bounding box detecting method may take a bounding box which is slightly larger or slightly smaller than the vehicle as a correct identification, which may result in missed detection or misdetection and thus the static map cannot reflect a real world, leading to a poor accuracy.

SUMMARY

A stationary object detecting method, a stationary object detecting apparatus and an electronic device are provided in embodiments of the present disclosure.

In a first aspect, an embodiment of the present disclosure provides a stationary object detecting method, including:

obtaining point cloud data of a scene and feature information of each of data points in the point cloud data, where a background and a stationary object temporarily in a stationary state are included in the scene;

performing a triangulation network connection on each of the data points in the point cloud data to generate a triangular network model, and taking a picture of the triangular network model using a preset camera to obtain an image, where each pixel point in the image corresponds to a triangle in the triangular network model;

obtaining a first data point corresponding to each pixel point in the image, and obtaining a feature map of the point cloud data according to feature information of each first data point, where the first data point is a data point on a vertex of a triangle corresponding to each pixel point;

inputting the feature map into a classification model to obtain data points corresponding to the stationary object in the point cloud data.

In one possible implementation of the first aspect, the feature information of the data points includes at least one of intensity information, a linear probability, a planar probability, a scattered probability, depth information, an optimal domain, and a vertical component of a normal vector of the optimal domain of the data points.

In another possible implementation of the first aspect, the feature map includes a first feature map and a second feature map, and the obtaining a feature map of the point cloud data according to feature information of each first data point includes:

generating the first feature map of the point cloud data according to intensity information, a planar probability, and a scattered probability of each first data point;

generating the second feature map of the point cloud data according to an optimal domain, depth information, and a vertical component of a normal vector of the optimal domain of each first data point; and the inputting the feature map into a classification model to obtain the stationary object in the point cloud data includes:

inputting the first feature map and the second feature map into the classification model to obtain the stationary object in the point cloud data.

In another possible implementation of the first aspect, the inputting the feature map into a classification model to obtain data points corresponding to the stationary object in the point cloud data includes:

inputting the feature map into the classification model to obtain a category of each pixel point in the image, where the category includes background or stationary object;

determining a category of a data point corresponding to each pixel point according to the category of each pixel point;

clustering each of the data points in the point cloud data according to categories of the data points and a distance between each two of the data points to obtain at least one data cluster;

determining the data points corresponding to the stationary object according to a shape of each data cluster and a number of data points included in each data cluster.

In another possible implementation of the first aspect, the inputting the feature map into a classification model to obtain data points corresponding to the stationary object in the point cloud data includes:

inputting the feature map into a SnapNet classification model to obtain a category of each pixel point in the image, where the SnapNet classification model is a two-class network model for distinguishing between a background and a stationary object.

In another possible implementation of the first aspect, after the determining the data points corresponding to the stationary object according to a shape of each data cluster and a number of data points included in each data cluster, the method further includes:

performing an oriented bounding box filtering on the data points corresponding to the stationary object to enclose the data points corresponding to the stationary object in the oriented bounding box.

In another possible implementation of the first aspect, before the obtaining feature information of each of data points in the point cloud data, the method further includes:

performing a pre-processing on the point cloud data to remove a moving ground object in the scene and generate evenly distributed point cloud data.

In another possible implementation of the first aspect, before the taking a picture of the triangular network model using a preset camera, the method further includes:

generating a camera parameter according to a preset constraint, where the constraint includes: a pitch angle of a camera is greater than or equal to a preset angle, and a proportion of effective pixels in a generated image is higher than a preset value;

generating the preset camera according to the camera parameter.

In another possible implementation of the first aspect, the feature information includes an optimal domain, and the obtaining feature information of each of data points in the point cloud data includes:

for each data point, obtaining all domains of the each data point, and a linear probability, a planar probability and a scattered probability of each of the domains;

determining an amount of domain information of each of the domains according to the linear probability, the planar probability, and the scattered probability of each of the domains;

taking a domain with a smallest amount of domain information as the optimal domain of the each data point, and taking a linear probability, a planar probability and a scattered probability of the optimal domain as the linear probability, the planar probability and the scattered probability of the each data point, respectively.

In a second aspect, an embodiment of the present disclosure provides a stationary object detecting apparatus, comprising:

a first obtaining module, configured to obtain point cloud data of a scene and feature information of each of data points in the point cloud data, where a background and a stationary object temporarily in a stationary state are included in the scene;

a triangular network generating module, configured to perform a triangulation network connection on each of the data points in the point cloud data to generate a triangular network model;

a picture taking module, configured to take a picture of the triangular network model using a preset camera to obtain an image, where each pixel point in the image corresponds to a triangle in the triangular network model;

a second obtaining module, configured to obtain a first data point corresponding to each pixel point in the image, and obtain a feature map of the point cloud data according to feature information of each first data point, where the first data point is a data point on a vertex of a triangle corresponding to each pixel point;

a classifying module, configured to input the feature map into a classification model to obtain data points corresponding to the stationary object in the point cloud data.

In one possible implementation of the second aspect, the feature information of the data points includes at least one of intensity information, a linear probability, a planar probability, a scattered probability, depth information, an optimal domain, and a vertical component of a normal vector of the optimal domain of the data points.

In another possible implementation of the second aspect, the feature map includes a first feature map and a second feature map, the second obtaining module is specifically configured to generate the first feature map of the point cloud data according to intensity information, a planar probability, and a scattered probability of each first data point; and generate the second feature map of the point cloud data according to an optimal domain, depth information, and a vertical component of a normal vector of the optimal domain of each first data point;

the classifying module is specifically configured to input the first feature map and the second feature map into the classification model to obtain the stationary object in the point cloud data.

In another possible implementation of the second aspect, the classifying module includes:

a classifying unit, configured to input the feature map into the classification model to obtain a category of each pixel point in the image, where the category includes background or stationary object;

a first determining unit, configured to determine a category of a data point corresponding to each pixel point according to the category of each pixel point;

a clustering unit, configured to cluster each of the data points in the point cloud data according to categories of data points and a distance between each two of the data points to obtain at least one data cluster;

a second determining unit, configured to determine the data points corresponding to the stationary object according to a shape of each data cluster and a number of data points included in each data cluster.

In another possible implementation of the second aspect, the classifying module is specifically configured to input the feature map into a SnapNet classification model to obtain a category of each pixel point in the image, where the SnapNet classification model is a two-class network model for distinguishing between a background and a stationary object.

In another possible implementation of the second aspect, the apparatus further includes:

a filtering module, configured to perform an oriented bounding box filtering on the data points corresponding to the stationary object to enclose the data points corresponding to the stationary object in the oriented bounding box.

In another possible implementation of the second aspect, the apparatus further includes:

a pre-processing module, configured to perform a pre-processing on the point cloud data to remove a moving ground object in the scene and generate evenly distributed point cloud data.

In another possible implementation of the second aspect, the apparatus further includes:

a camera parameter generating module, configured to generate a camera parameter according to a preset constraint, where the constraint includes: a pitch angle of a camera is greater than or equal to a preset angle, and a proportion of effective pixels in a generated image is higher than a preset value;

a camera generating module, configured to generate the preset camera according to the camera parameter.

In another possible implementation of the second aspect, the feature information includes an optimal domain, and the first obtaining module is specifically configured to: for each data point, obtain all domains of the each data point, and a linear probability, a planar probability and a scattered probability of each of the domains; determine an amount of domain information of each of the domains according to the linear probability, the planar probability, and the scattered probability of each of the domains; take a domain with a smallest amount of domain information as the optimal domain of the each data point, and take a linear probability, a planar probability and a scattered probability of the optimal domain as the linear probability, the planar probability and the scattered probability of the each data point, respectively.

In a third aspect, an embodiment of the present disclosure provides an electronic device, comprising:

a memory, configured to store a computer program;

a processor, configured to execute the computer program to perform the stationary object detecting method of the first aspect.

In a fourth aspect, an embodiment of the present disclosure provides a computer storage medium, where the storage medium stores a computer program, and the computer program, when being executed, implements the stationary object detecting method of the first aspect.

According to the stationary object detecting method, the stationary object detecting apparatus, and the electronic device provided by the embodiments of the present disclosure, point cloud data of a scene and feature information of each of data points in the point cloud data are obtained, where a background and a stationary object temporarily in a stationary state are included in the scene; a triangulation network connection is performed on each data point in the point cloud data to generate a triangular network model, and a picture of the triangular network model is taken by using a preset camera to obtain an image, where each pixel point in the image corresponds to a triangle in the triangular network model; a first data point corresponding to each pixel point in the image is obtained, and a feature map of the point cloud data according to feature information of each first data point is obtained; the feature map is input into a classification model to obtain data points corresponding to the stationary object in the point cloud data. That is, according to the present embodiment, by obtaining a feature map of point cloud data of a scene and using the feature map as an input of a classification model, an accurate detection of a stationary object in a scene is achieved and a generation accuracy of a stationary map is improved.

BRIEF DESCRIPTION OF THE DRAWINGS

In order to illustrate the technical solution of embodiments of the present disclosure or that of the prior art, drawings that are used in the description of the embodiments or the prior art will be described briefly below. It is apparent that the drawings in the following description are only some embodiments of the present disclosure, and other drawings can be obtained according to these drawings by those skilled in the art without creative efforts.

DETAILED DESCRIPTION OF THE EMBODIMENTS

In order to make the objectives, technical solutions, and advantages of the embodiments of the present disclosure more clearly, the technical solutions of the embodiments of the present disclosure will be clearly and comprehensively described in the following with reference to the accompanying drawings of the embodiments of the present disclosure. It is obvious that the described embodiments are only a part of, rather than all of, embodiments of the present disclosure. All other embodiments obtained by those skilled in the art based on the embodiments of the present disclosure without creative efforts shall fall within the scope of the present disclosure.

The stationary object described in the embodiments is a ground object (for example, a vehicle, a bicycle or the like) that is in a stationary state temporarily.

According to a stationary object detecting method provided by embodiments of the present disclosure, feature information of each data point in point cloud data of a scene is obtained, a feature map of the point cloud data is generated according to the feature information of each data point, and the feature map is input into a pre-trained classification model to obtain data points corresponding to the stationary object in the point cloud data, thereby realizing an accurate detection of a stationary object in the scene and improving determining accuracy of a stationary map.

The technical solution of the present disclosure will be described in detail below with specific embodiments. The following specific embodiments may be combined with each other, and the same or similar concepts or processes may not be repeated in some embodiments.

Figure 1:
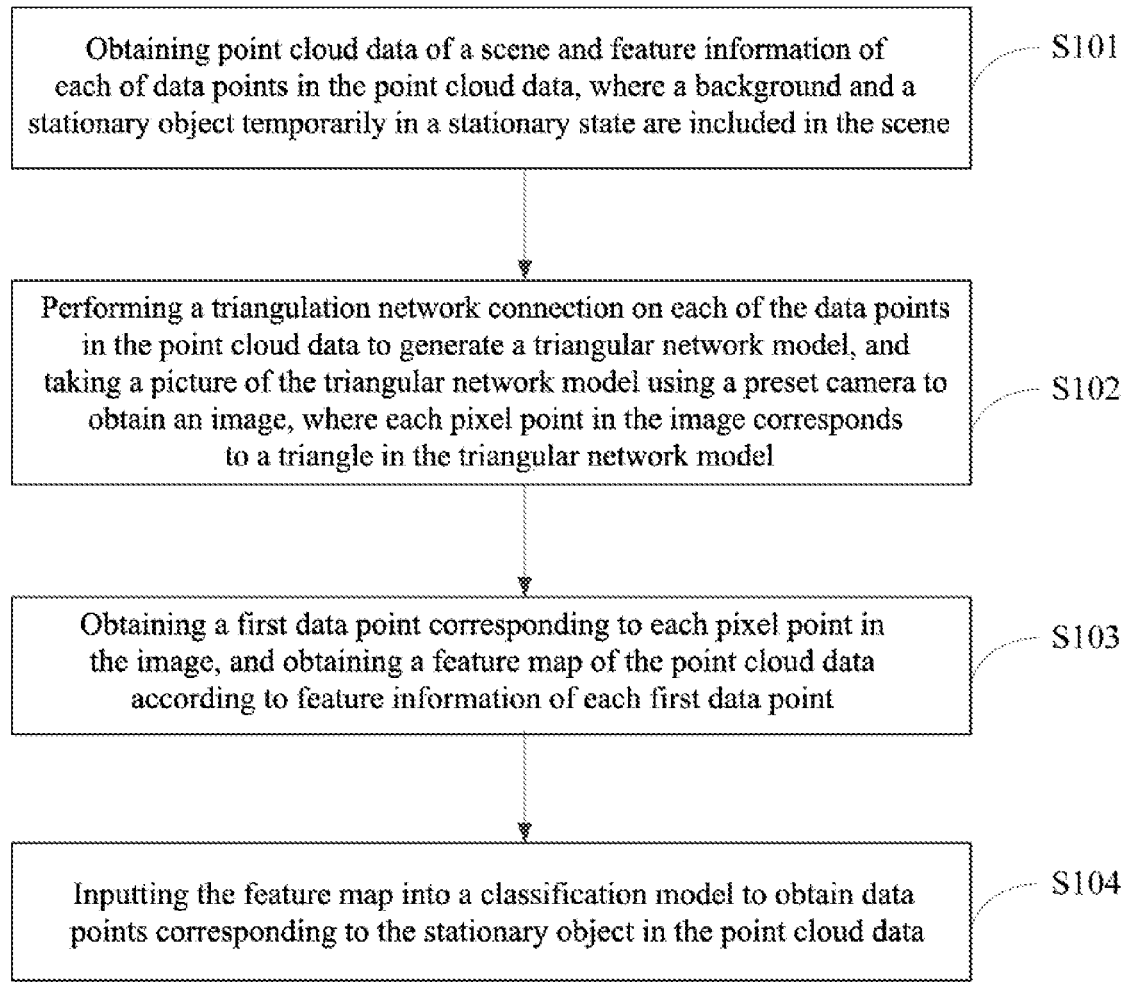
FIG. 1 is a schematic flowchart diagram of a stationary object detecting method according to Embodiment 1 of the present disclosure.

FIG. 1 is a schematic flowchart diagram of a stationary object detecting method according to Embodiment 1 of the present disclosure. As shown in FIG. 1, the method of the present embodiment may include:

S101: Obtaining point cloud data of a scene and feature information of each of data points in the point cloud data, where a background and a stationary object temporarily in a stationary state are included in the scene.

The execution subject of the embodiment may be a stationary object detecting apparatus having a function of data processing and stationary object detecting. The detecting apparatus in the embodiment may be a part of an electronic device, such as a processor of an electronic device. Optionally, the detecting apparatus in the embodiment may also be a separate electronic device.

The electronic device in the embodiment may be a user equipment (UE), a mobile station (MS), a mobile terminal (MT), etc., and may be a device that provides data connectivity to a user, such as a handheld device, an in-vehicle device having a function of wireless connection and the like. At present, examples of a terminal device are: a mobile phone, a tablet, a laptop, a personal digital assistant, a mobile internet device (MID), a wearable device (for example, a smart glass, a smart watch, a smart bracelet, etc.), a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal device in smart home, etc.

Optionally, the electronic device in the embodiment further has a map generating function, that is, the stationary object detecting method of the embodiment may be performed in a process of generating a stationary map.

By way of example, the present embodiment is illustrated by taking an electronic device as an execution subject, where the stationary object is a vehicle.

Ground objects in the scene of the embodiment include a background, a stationary object temporarily in a stationary state, and a moving ground object in a moving state. The point cloud data of the scene is obtained by scanning each ground object in the scene.

The point cloud data of the scene in the embodiment may be obtained by the electronic device from another device.

Optionally, the electronic device in the embodiment has a scanning function, and the point cloud data of the scene is obtained by scanning the scene.

Original point cloud data generated by scanning includes intensity information and depth information of each data point. In order to improve accuracy for extracting a vehicle, some other features are added to highlight the vehicle, for example, edge information and planar information of the data points can be added.

The other features mentioned above may be extracted manually.

S102: Performing a triangulation network connection on each of the data points in the point cloud data to generate a triangular network model, and taking a picture of the triangular network model using a preset camera to obtain an image, where each pixel point in the image corresponds to a triangle in the triangular network model.

In order to avoid a hole or unevenness in an image generated subsequently, it is first necessary to construct the point cloud data of the scene obtained above into a triangular network model. Specifically, a triangulation network connection on each of the data points in the point cloud data is performed to generate a triangular network model, such that one triangle corresponds to three data points. Each triangle is identified to obtain an ID of a data point corresponding to an ID of each triangle.

Optionally, a greedy projection triangulation algorithm may be used in the present embodiment to perform a triangulation network connection on each of the data points in the point cloud data and generate a triangular network model.

Then, a preset camera is used to take a picture of the triangular network model to generate an image of the triangular network model.

In the present embodiment, the preset camera is determined according to a preset camera parameter, for example, according to a camera parameter such as a size of an elevation angle and a pixel size.

In one possible implementation of the embodiment, before the taking a picture of the triangular network model by using a preset camera in the foregoing S102, the embodiment further includes:

S102a: Generating a camera parameter according to a preset constraint, where the constraint includes that: a pitch angle of a camera is greater than or equal to a preset angle, and a proportion of effective pixels in a generated image is higher than a preset value.

S102b: Generating the preset camera according to the camera parameter.

Specifically, a constraint is preset according to actual needs, and a specific constraint includes that a pitch angle of the camera is greater than or equal to a preset angle (for example, 60°), and a proportion of effective pixels in a generated image is higher than a preset value (30%). Then, a camera parameter is generated according to the preset constraint described above.

Thus, in actual practice, a series of images of a triangular network model are obtained according to the generated camera parameter and the set image size (e.g., 224*224).

In the embodiment, one image is taken as an example for description, and the processing procedure for each image is the same, and reference may be made to the example.

S103: Obtaining a first data point corresponding to each pixel point in the image, and obtaining a feature map of the point cloud data according to feature information of each first data point.

The first data point is a data point on a vertex of a triangle corresponding to each pixel point.

According to the above steps, a triangular network model and an image of the triangular network model are obtained, where each pixel in the image corresponds to a triangle in the triangular network model. Then an ID of a triangle corresponding to each pixel can be obtained. And an ID of each triangle corresponds to IDs of three data points. For example, pixel point A corresponds to triangle B, and the triangle B corresponds to data point a1, data point a2, and data point a3. Then it can be obtained that the pixel point A corresponds to the data point a1, the data point a2, and the data point a3.

In order to facilitate the calculation, in the embodiment, one pixel point is set to correspond to one data point. For example, any data point of the data point a1, the data point a2, and the data point a3 is used as a first pixel point corresponding to the pixel point A. Optionally, a first data point in the data point a1, the data point a2, and the data point a3 is used as the first pixel point corresponding to the pixel point A according to a counterclockwise (or clockwise) direction.

According to the above method, the first data point corresponding to each pixel point in the image is obtained, the feature information of each first data point is obtained, and feature information of the first feature point is filled to a corresponding pixel point to obtain the feature map of the point cloud data.

It should be noted that, as can be seen from the above, each data point includes a plurality of features, such that different feature components can generate different feature maps. Thus, the feature map generated in the embodiment may be one or more.

S104: Inputting the feature map into a classification model to obtain data points corresponding to the stationary object in the point cloud data.

According to the above steps, the feature map of the point cloud data is obtained, and the feature map is input into a pre-trained classification model, and each pixel in the image is classified to obtain whether a category of each pixel is background or stationary object.

Then, according to a corresponding relationship between a pixel point and a data point, a data point corresponding to a stationary object in the point cloud data can be determined. For example, a data point corresponding to a pixel point of which the category is stationary object are used as the data points corresponding to the stationary object.

The classification model used in the embodiment may be any model that can be perform classification.

In one possible implementation of the embodiment, the foregoing S104 may specifically include:

S104a: Inputting the feature map into a SnapNet classification model to obtain a category of each pixel point in the image, where the SnapNet classification model is a two-class network model for distinguishing between a background and a stationary object.

Figure 2:
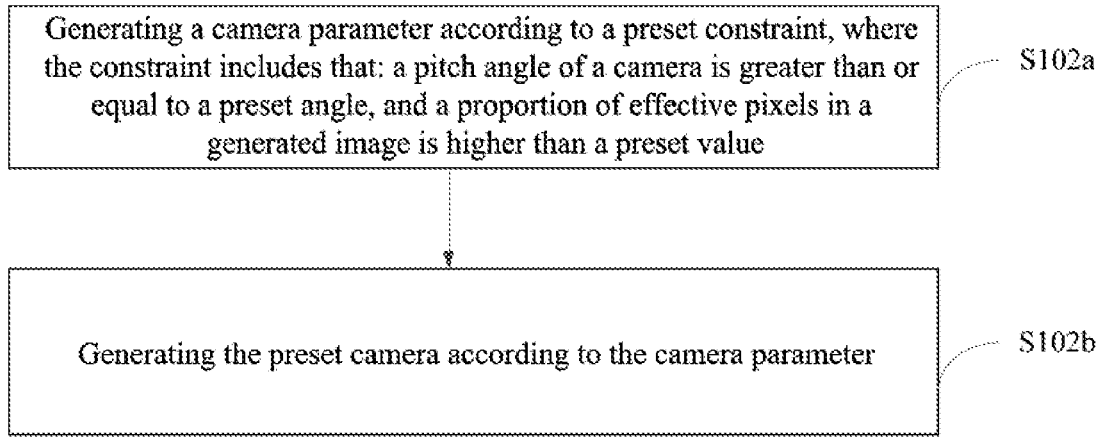
FIG. 2 is a schematic flowchart diagram of generating a camera according to Embodiment 1 of the present disclosure.

The classification model in the embodiment is a SnapNet classification model. As shown in FIG. 2, the SnapNet network structure includes two units (Unet), and each Unet constitutes a separate image-based semantic segmentation network. During training, two networks are trained separately. After the training is completed, the two networks are truncated at the last convolutional layer, with a Residual Net is rebuilt and trained separately. The test process is voted according to the results of the three networks to get a final classification result.

It can be seen from the above that the SnapNet classification model of the embodiment is a two-class network model for distinguishing between background and a stationary object, thereby realizing an accurate identification of a stationary object such as a vehicle in a scene.

According to the stationary object detecting method provided by the embodiment of the present disclosure, point cloud data of a scene and feature information of each of data points in the point cloud data are obtained, where a background and a stationary object temporarily in a stationary state are included in the scene; a triangulation network connection is performed on each data point in the point cloud data to generate a triangular network model, and a picture of the triangular network model is taken by using a preset camera to obtain an image, where each pixel point in the image corresponds to a triangle in the triangular network model; a first data point corresponding to each pixel point in the image is obtained, and a feature map of the point cloud data according to feature information of each first data point is obtained; the feature map is input into a classification model to obtain data points corresponding to the stationary object in the point cloud data. That is, according to the present embodiment, by obtaining a feature map of point cloud data of a scene and using the feature map as an input of a classification model, an accurate detection of a stationary object in a scene is achieved and a generation accuracy of a stationary map is improved.

In one possible implementation of the embodiment, in order to reduce the amount of data of the data processing, before the foregoing S101, the embodiment further includes:

S100: Performing a pre-processing on the point cloud data to remove a moving ground object in the scene and generate evenly distributed point cloud data.

Specifically, the pre-processing performed on the point cloud data includes an operation such as a single frame point cloud fusion, a dynamic ground object filtering, and the like, thereby obtaining evenly distributed point cloud data, and removing the moving ground object in the scene, greatly reducing the amount of data and improving efficiency and accuracy of a subsequent classification.

In one possible implementation of the embodiment, the feature information of the data points in the embodiment includes at least one of intensity information, a linear probability, a planar probability, a scattered probability, depth information, an optimal domain and a vertical component of a normal vector of the optimal domain of the data points.

The intensity information and the depth information of the data point can be obtained during a scanning process, and other feature information of the data point is described in detail below.

Figure 3:
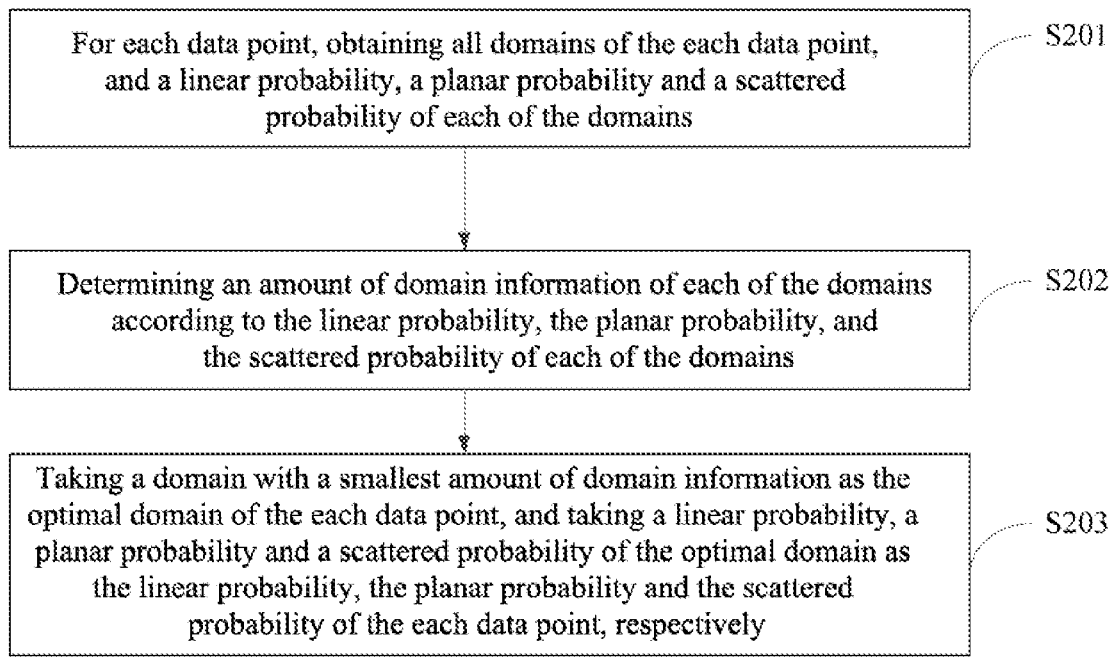
FIG. 3 is a flowchart diagram of a method for determining feature information of a data point according to Embodiment 1 of the present disclosure.

FIG. 3 is a flowchart diagram of a method for determining feature information of a data point according to the present embodiment. As shown in FIG. 3, when feature information of the embodiment includes an optimal domain, the obtaining the feature information of each of data points in the point cloud data in the S101 may include:

S201: For each data point, obtaining all domains of the each data point, and a linear probability, a planar probability and a scattered probability of each of the domains;

S202: Determining an amount of domain information of each of the domains according to the linear probability, the planar probability, and the scattered probability of each of the domains;

S203: Taking a domain with a smallest amount of domain information as the optimal domain of the each data point, and taking a linear probability, a planar probability and a scattered probability of the optimal domain as the linear probability, the planar probability and the scattered probability of the each data point, respectively.

Specifically, the data point $p_i(x_i,y_i,z_i)$ is taken as an example, to which other data points may be referred. First, the best neighborhood of the data point $p_i$ is obtained, and the neighborhood information of the point cloud is described by using the covariance matrix (1):

$$M = \sum_{j=1}^{K}(X_j - \overline{X})^T(X_j - \overline{X}) \quad (1)$$

In the above formula, $X_j$ (j=1, 2 . . . K) represents the k neighborhood of $p_i$, $\overline{X}$ is the center of gravity of the neighborhood, and a decomposition can be performed on M to obtain three eigenvectors ($\delta_1 > \delta_2 > \delta_3$), and the three eigenvectors represent fitting residuals in three main directions, respectively. Combining the three eigenvectors, it is obtained:

$$p_{line} = \frac{\delta_1 - \delta_2}{\delta_1}, \; p_{plane} = \frac{\delta_2 - \delta_3}{\delta_1}, \; p_{noise} = \frac{\delta_3}{\delta_1} \quad (2)$$

The formula (2) can describe probabilities of a data point being linear, planar and scattered, that is, the $p_{line}$ is a linear probability of the data point $p_i$, the $p_{plane}$ is a planar probability of the data point $p_i$, and the $p_{noise}$ is a scattered probability of the data point $p_i$.

According to the information entropy theory, the amount of neighborhood information can be expressed as:

$$E_f = -p_{line}*\log(p_{line}) - p_{plane}*\log(p_{plane}) - p_{noise}*\log(p_{noise}) \quad (3)$$

If local neighborhood of a point changes, the corresponding $E_f$ also changes. According to the information entropy theory, the larger the $E_f$ is, the more complicated the neighborhood information is. On the other hand, the smaller the $E_f$ is, the simpler the neighborhood information is. For point cloud data, it is expected to find a neighborhood having simplest information, at which time an actual shape of the data point can be best described, so the best neighborhood is selected by the following method:

$$r_{opt} = \arg_{r_i \in [r_{min}, r_{max}]} \min E_f(r_i) \quad (4)$$

After the best neighborhood is selected, $p_{noise}$, $p_{plane}$, $r_{opt}$ under the best neighborhood and the vertical component normal_z of a normal vector of the best neighborhood are extracted.

Referring to the above steps, the feature information of each data point can be obtained.

Figure 4:
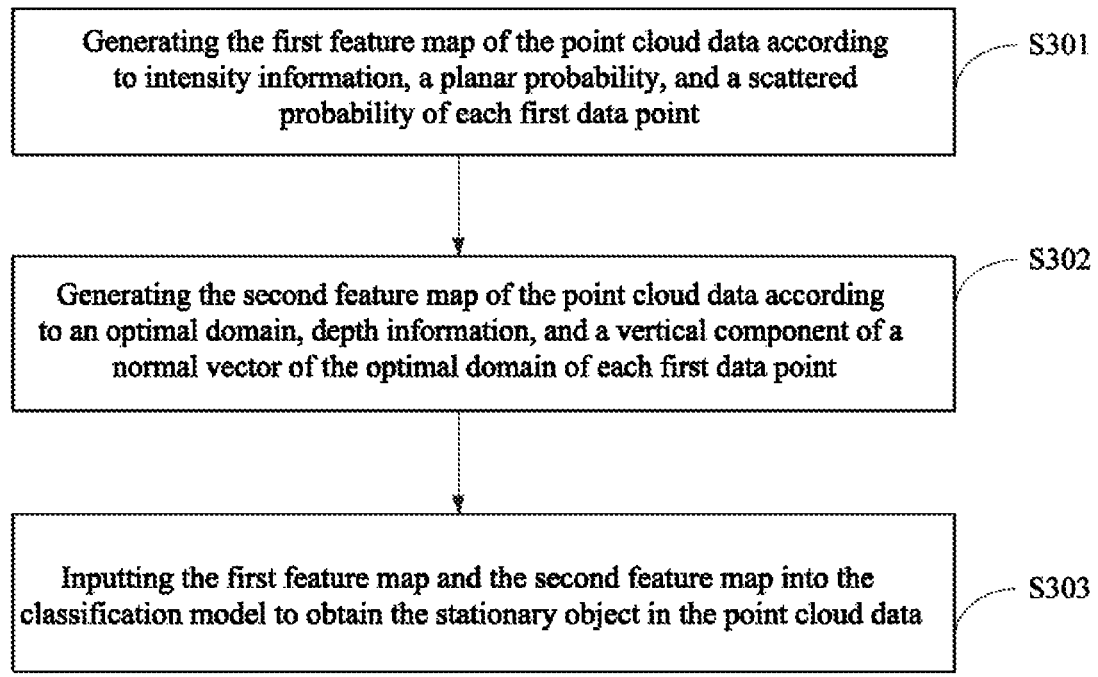
FIG. 4 is a schematic flowchart diagram of detecting a stationary object according to Embodiment 2 of the present disclosure.

FIG. 4 is a schematic flowchart diagram of detecting a stationary object according to Embodiment 2 of the present disclosure. On the basis of the above embodiment, as shown in FIG. 4, the feature map of the embodiment is two, which are a first feature map and a second feature map, respectively. At this time, the obtaining a feature map of the point cloud data according to feature information of each first data point in the above S103 may include:

S301: Generating the first feature map of the point cloud data according to intensity information, a planar probability, and a scattered probability of each first data point.

S302: Generating the second feature map of the point cloud data according to an optimal domain, depth information, and a vertical component of a normal vector of the optimal domain of each first data point.

Specifically, the feature information of each first data point in the embodiment includes intensity information, a planar probability, a scattered probability, an optimal domain, depth information, and a vertical component of a normal vector of the optimal domain.

Then the second feature map of the point cloud data may be generated according to the optimal domain, the depth information, and the vertical component of the normal vector of the optimal domain of each first data point. The second feature map of the point cloud data is generated according to the optimal domain, the depth information, and the vertical component of the normal vector of the optimal domain of each first data point.

At this time, the above S104 can be replaced with the following S303.

S303: Inputting the first feature map and the second feature map into the classification model to obtain the stationary object in the point cloud data.

As shown in FIG. 2, the SnapNet classification model of the embodiment includes a first unit and a second unit, and the first feature map is used as an input of the first unit to obtain a first classification result of the first unit. The second feature map is used as an input of the second unit to obtain a second classification result of the second unit. The inputs of the first unit and the second unit are then used as inputs to the Residual Net to obtain a third classification result of Residual Net.

Then, according to the first classification result, the second classification result, and the third classification result, a classification of each pixel point in the image is obtained, which is divided into background and stationary object (for example, vehicle). That is, the embodiment determines a category of a pixel point by means of voting through three networks, thereby improving accuracy of a classification.

Finally, an accurate classification of each pixel point in the image is achieved, which is divided into background and stationary object (for example, vehicle).

According to the stationary object detecting method provided by the embodiment of the present disclosure, a first feature map of point cloud data is generated according to intensity information, a planar probability, and a scattered probability of each first data point, a second feature map of the point cloud data is generated according to an optimal domain, depth information, and vertical component of normal domain of the optimal domain of each first data point, and the first feature map and the second feature map are input into a classification model, thereby obtaining a static object in the point cloud data accurately.

Figure 5:
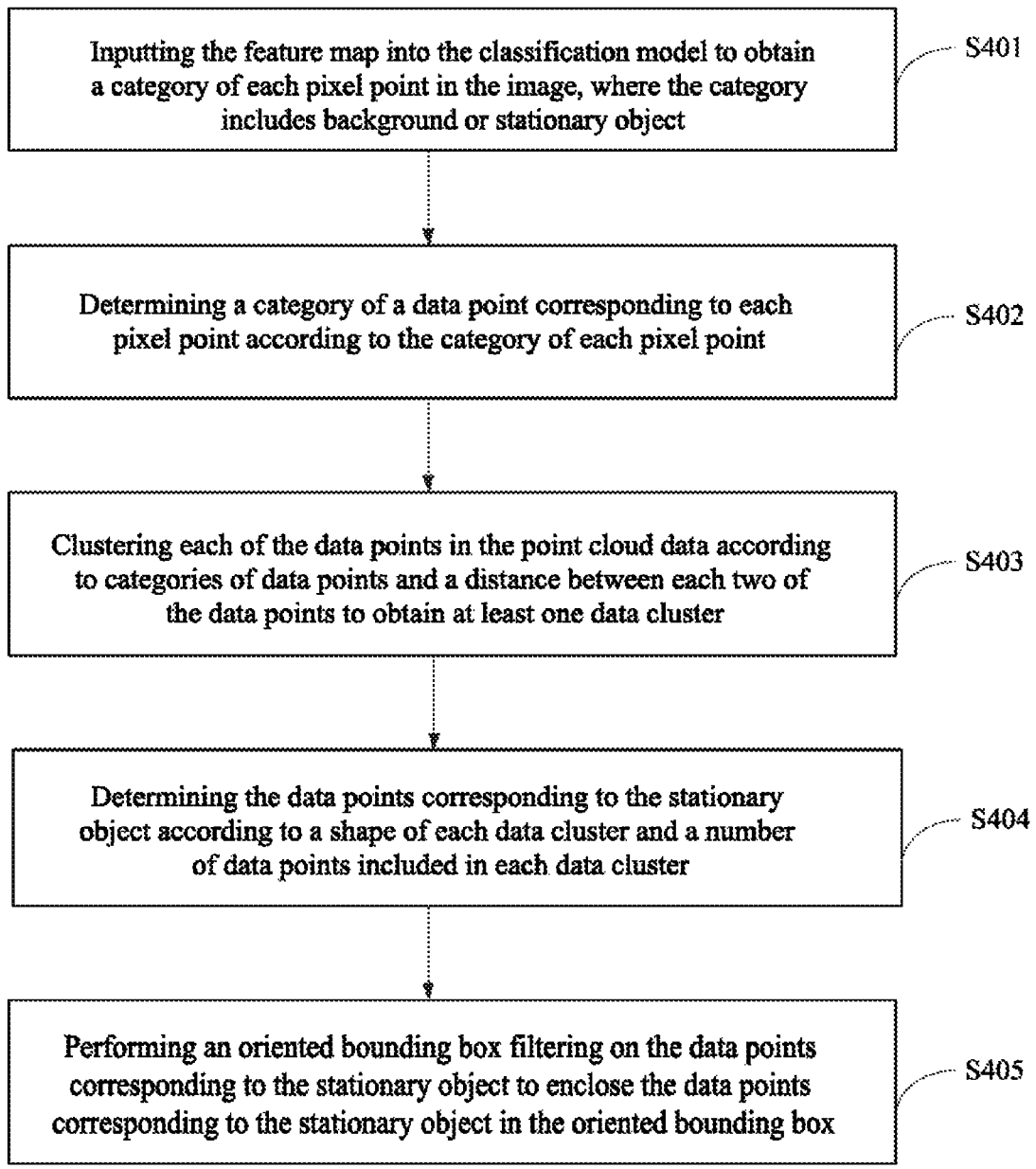
FIG. 5 is a schematic flowchart diagram of detecting a stationary object according to Embodiment 3 of the present disclosure.

FIG. 5 is a schematic flowchart diagram of detecting a stationary object detection according to Embodiment 3 of the present disclosure. On the basis of the above embodiment, the embodiment relates to a specific process of inputting the feature map into a classification model to obtain data points corresponding to the stationary object in the point cloud data. As shown in FIG. 5, the above S104 may include:

S401: Inputting the feature map into the classification model to obtain a category of each pixel point in the image, where the category includes background or stationary object.

Specifically, in the embodiment, the feature map is input into a classification model, and a category of each pixel point in the image can be obtained, that is, whether a category of a pixel point in the image is background or stationary object.

S402: Determining a category of a data point corresponding to each pixel point according to the category of each pixel point.

It can be seen from the above that each pixel in the image corresponds to a first data point, such that a category of a pixel point is used as a category of a first data point corresponding to the pixel point. Thus, according to the inverse mapping, a category of each data point in the point cloud data can be obtained.

S403: Clustering each of the data points in the point cloud data according to categories of data points and a distance between each two of the data points to obtain at least one data cluster.

Then, according to the category of the data point and the distance between each two of the data points, data points that having the same category and the distance satisfying a preset value are clustered into one class, and at least one data cluster of the point cloud data is obtained.

The specific clustering process can be implemented according to the following algorithm flow:

```
while (find_seed == true) {
    seeds.push_back(seed);
    clusters.push_back(seed);
    while(seeds.size>0) {
        current_seed=seeds[last_index];
        if (distance(current_seed, point) < DIS_THRESHOLD
        && point.label=CAR_LABEL
        && point_is_not_deal(point)) {
            seeds.push_back(point);
            clusters.push_back(point);
        }
    }
}
```

Through the above process, data points corresponding to a vehicle are clustered into separate data clusters.

S404: Determining the data points corresponding to the stationary object according to a shape of each data cluster and a number of data points included in each data cluster.

Specifically, according to the foregoing steps, the data points corresponding to the point cloud data are divided into different data clusters, so that whether a data cluster truly belongs to data points of a vehicle is determined according to a shape of each cluster and a number of points included in the cluster. If the data cluster belongs to the data points of the vehicle, the data points in the data cluster is taken as the data points of the vehicle. If the data cluster does not belong to the data points of the vehicle, the category of each data point in the data cluster is set as the background.

That is, in the embodiment, point cloud data is clustered, a category of a data point corresponding to a stationary object is further detected according to the shape and the amount of data of the clustered data clusters, thereby improving the accuracy of determining a data point corresponding to a stationary object.

In the embodiment, after the foregoing S404, the method further includes:

S405: Performing an oriented bounding box filtering on the data points corresponding to the stationary object to enclose the data points corresponding to the stationary object in the oriented bounding box.

Specifically, an oriented bounding box is obtained for the cluster corresponding to the stationary object (for example, a vehicle), where the oriented bounding box is a minimum rectangular parallelepiped capable of wrapping a ground object. Generally, in the case of a ground level by default, an obtaining of an oriented bounding box is actually to obtain an oriented rectangle in a direction of a two-dimensional plane.

The obtaining process is as follows: an axis is set at first, and the axis is rotated according to a certain angular step, where all data points in the cluster are projected onto the axis and a projection length on the axis is obtained. An axis direction which has the minimum length is selected as a short axis direction of the oriented bounding box, where a long axis direction is perpendicular to the short axis direction. The projection length in the long axis direction is calculated from all the data points in the cluster, and thus the obtaining of an oriented bounding box is completed. A maximized range of the vehicle is bound by the oriented bounding box maximizes.

At this time, the category of all the data points in the oriented bounding box can be set as stationary object, thereby realizing an accurate detection of a stationary object in a background.

The bounding box in the embodiment is regressed after the classification is completed, and the flexibility is higher comparing to that of a regression through a network, and the IoU precision is also higher.

According to the stationary object detecting method provided by the embodiment of the present disclosure, a feature map is input into a classification model to obtain a category of each pixel point in an image, where the category includes background or stationary object; a category of a data point corresponding to each pixel point is determined according to the category of each pixel point; each of the data points in the point cloud data is clustered according to the category of the data point and a distance between each two of the data points to obtain at least one data cluster; the data point corresponding to the stationary object is determined according to a shape of each data cluster and a number of data points included in each data cluster; finally an oriented bounding box filtering is performed on the data point corresponding to the stationary object to enclose the data point corresponding to the stationary object in the oriented bounding box. That is, by performing cluster processing on the point cloud data, further detecting the category of a data point corresponding to the stationary object according to the shape and the amount of data of the cluster after clustering, the accuracy for determining a data point corresponding to a stationary object is improved.

Figure 6:
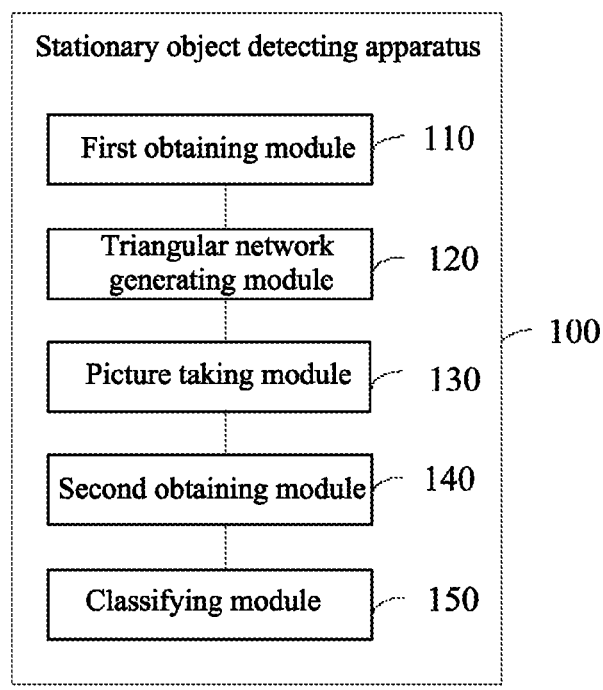
FIG. 6 is a schematic structural diagram of a stationary object detecting apparatus according to Embodiment 1 of the present disclosure.

FIG. 6 is a schematic structural diagram of a stationary object detecting apparatus according to Embodiment 1 of the present disclosure. As shown in FIG. 6, the stationary object detecting apparatus 100 of the embodiment may include:

a first obtaining module 110, configured to obtain point cloud data of a scene and feature information of each of data points in the point cloud data, where a background and a stationary object temporarily in a stationary state are included in the scene;

a triangular network generating module 120, configured to perform a triangulation network connection on each of the data points in the point cloud data to generate a triangular network model;

a picture taking module 130, configured to take a picture of the triangular network model using a preset camera to obtain an image, where each pixel point in the image corresponds to a triangle in the triangular network model;

a second obtaining module 140, configured to obtain a first data point corresponding to each pixel point in the image, and obtain a feature map of the point cloud data according to feature information of each first data point, where the first data point is a data point on a vertex of a triangle corresponding to each pixel point;

a classifying module 150, configured to input the feature map into a classification model to obtain data points corresponding to the stationary object in the point cloud data.

The stationary object detecting apparatus in the embodiment of the present disclosure can be used to perform the technical solution of the method embodiment shown above, where the implementation principles and the technical effects are similar to each other, and thus details are not described herein again.

In one possible implementation of the embodiment, the feature information of the data points includes at least one of intensity information, a linear probability, a planar probability, a scattered probability, depth information, an optimal domain, and a vertical component of a normal vector of the optimal domain of the data points.

In another possible implementation of the embodiment, the feature map includes a first feature map and a second feature map, the second obtaining module 140 is specifically configured to generate the first feature map of the point cloud data according to intensity information, a planar probability, and a scattered probability of each first data point; and generate the second feature map of the point cloud data according to an optimal domain, depth information, and a vertical component of a normal vector of the optimal domain of each first data point;

the classifying module 150, is specifically configured to input the first feature map and the second feature map into the classification model to obtain the stationary object in the point cloud data.

In another possible implementation of the embodiment, the classifying module 150 is specifically configured to input the feature map into a SnapNet classification model to obtain a category of each pixel point in the image, where the SnapNet classification model is a two-class network model for distinguishing between a background and a stationary object.

Figure 7:
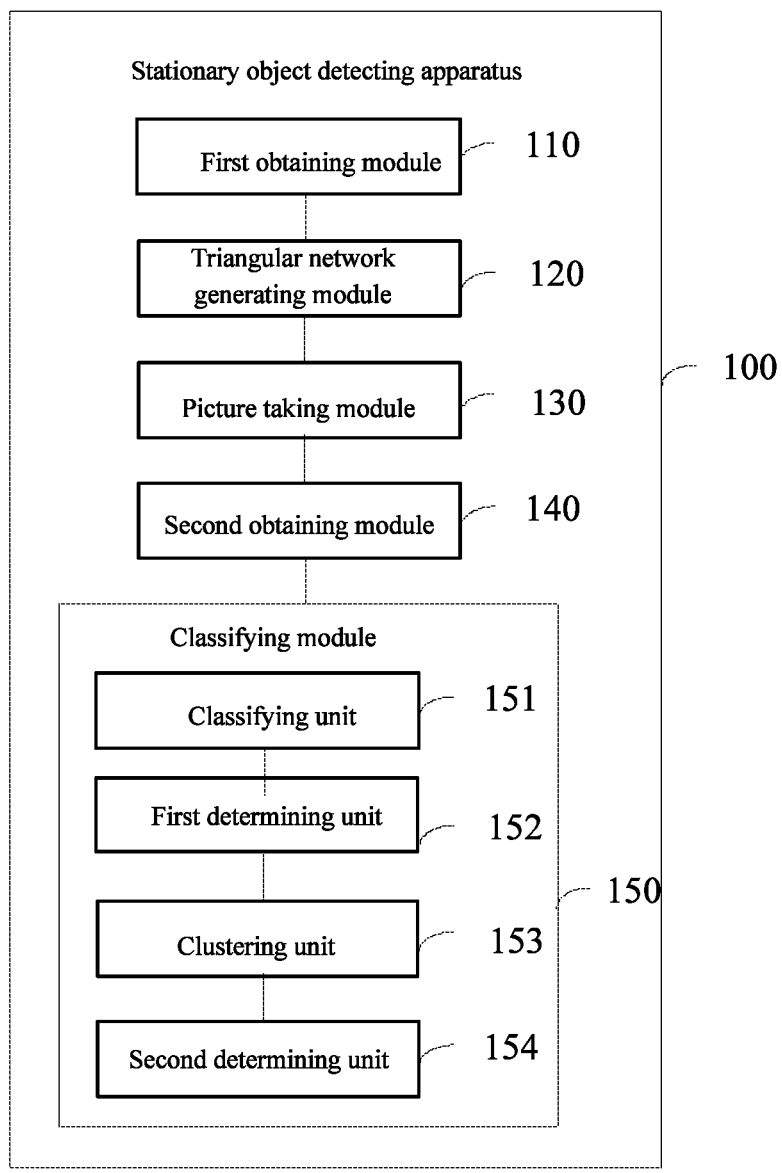
FIG. 7 is a schematic structural diagram of a stationary object detecting apparatus according to Embodiment 2 of the present disclosure.

FIG. 7 is a schematic structural diagram of a stationary object detecting apparatus according to Embodiment 2 of the present disclosure. On the basis of the foregoing embodiment, as shown in FIG. 7, the classifying module 150 includes:

a classifying unit 151, configured to input the feature map into the classification model to obtain a category of each pixel point in the image, where the category includes background or stationary object;

a first determining unit 152, configured to determine a category of a data point corresponding to each pixel point according to the category of each pixel point;

a clustering unit 153, configured to cluster each of the data points in the point cloud data according to categories of data points and a distance between each two of the data points to obtain at least one data cluster;

a second determining unit 154, configured to determine the data points corresponding to the stationary object according to a shape of each data cluster and a number of data points included in each data cluster.

The stationary object detecting apparatus in the embodiment of the present disclosure can be used to perform the technical solution of the method embodiment shown above, where the implementation principles and the technical effects are similar to each other, and thus details are not described herein again.

Figure 8:
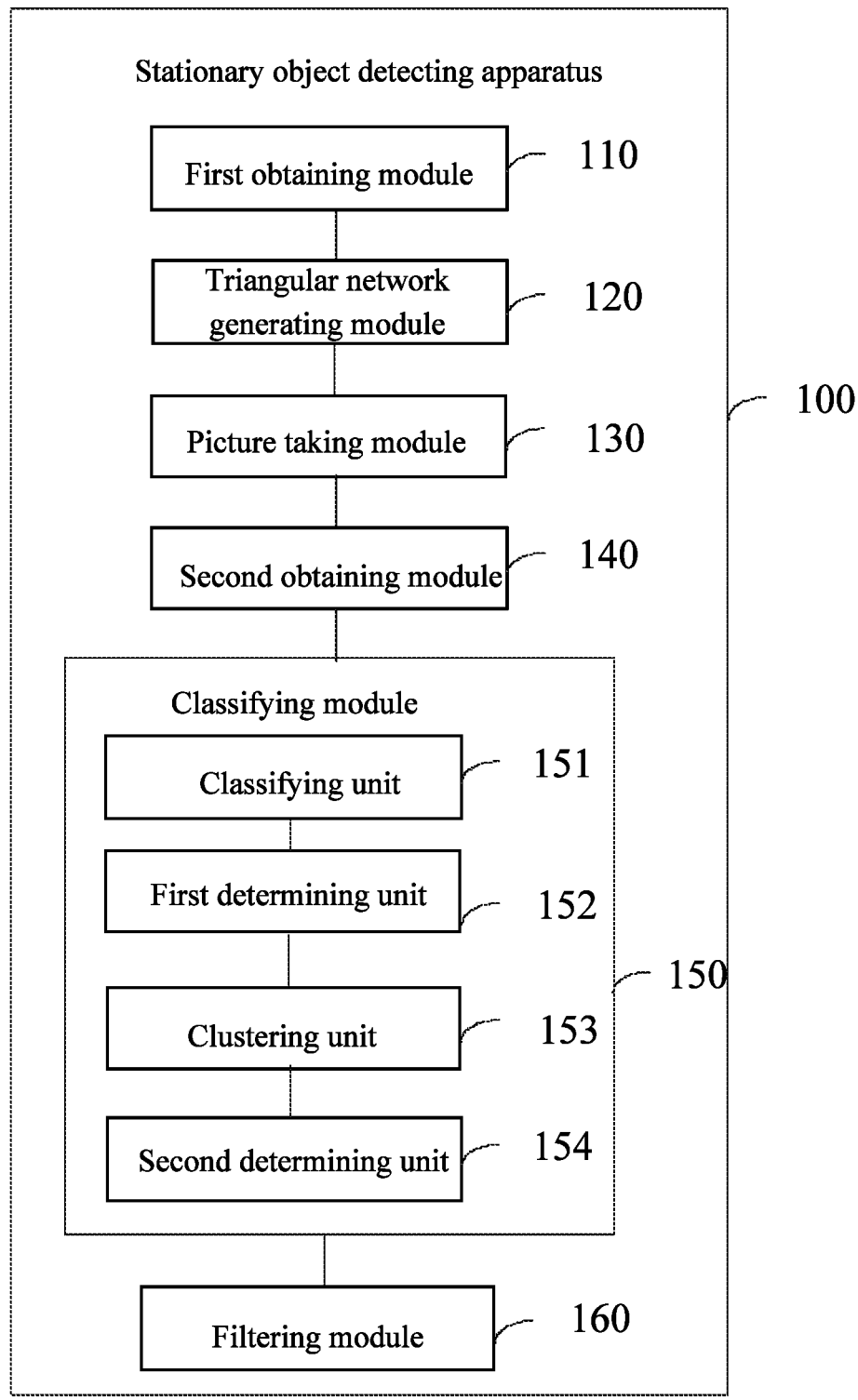
FIG. 8 is a schematic structural diagram of a stationary object detecting apparatus according to Embodiment 3 of the present disclosure.

FIG. 8 is a schematic structural diagram of a stationary object detecting apparatus according to Embodiment 3 of the present disclosure. On the basis of the foregoing embodiment, as shown in FIG. 8, the apparatus includes:

a filtering module 160, configured to perform an oriented bounding box filtering on the data points corresponding to the stationary object to enclose the data points corresponding to the stationary object in the oriented bounding box.

The stationary object detecting apparatus in the embodiment of the present disclosure can be used to perform the technical solution of the method embodiment shown above, and the implementation principles and the technical effects are similar to each other, and thus details are not described herein again.

Figure 9:
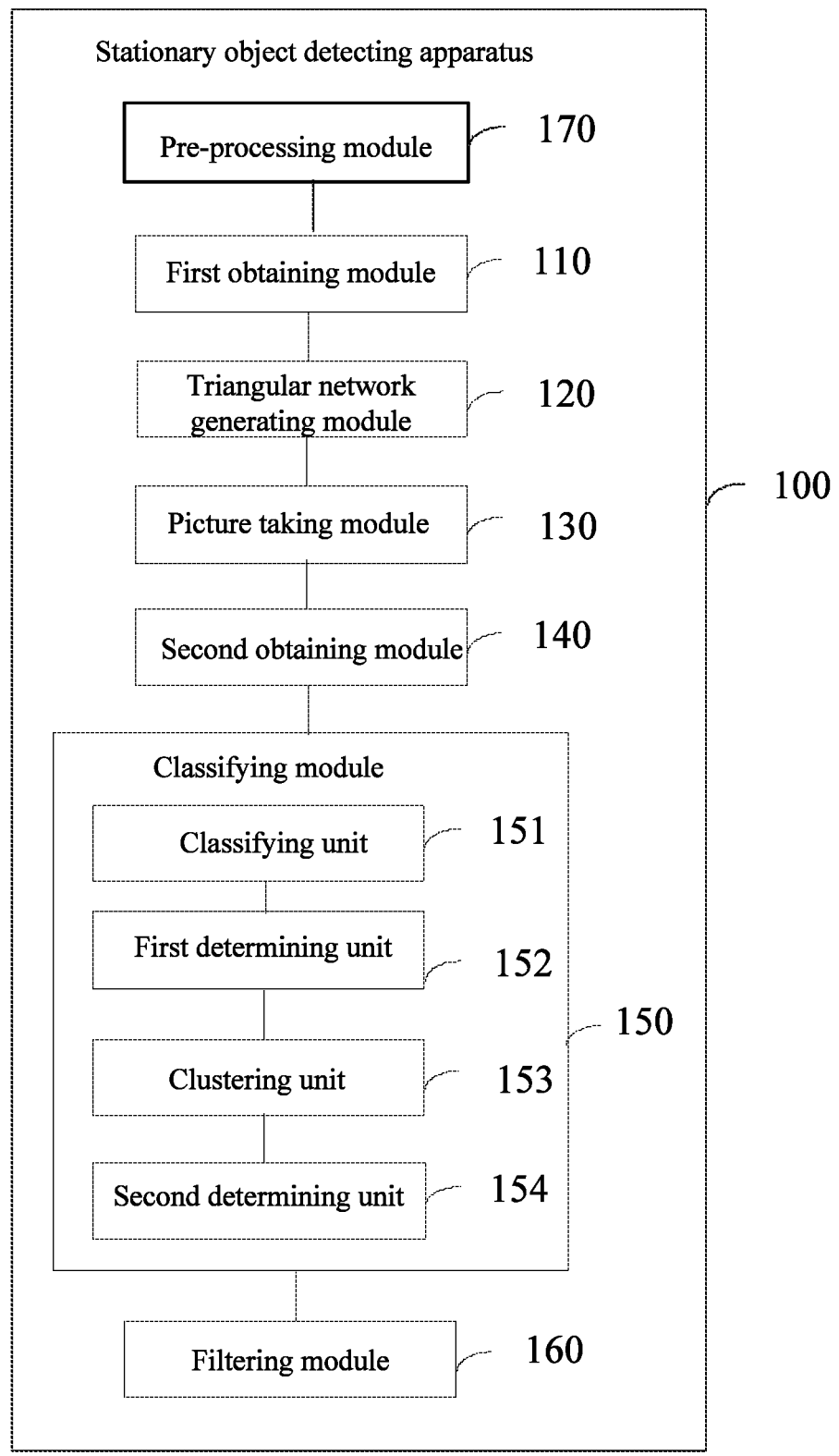
FIG. 9 is a schematic structural diagram of a stationary object detecting apparatus according to Embodiment 4 of the present disclosure.

FIG. 9 is a schematic structural diagram of a stationary object detecting apparatus according to Embodiment 4 of the present disclosure. On the basis of the foregoing embodiment, as shown in FIG. 9, the apparatus includes:

a pre-processing module 170, configured to perform a pre-processing on the point cloud data to remove a moving ground object in the scene and generate evenly distributed point cloud data.

Figure 10:
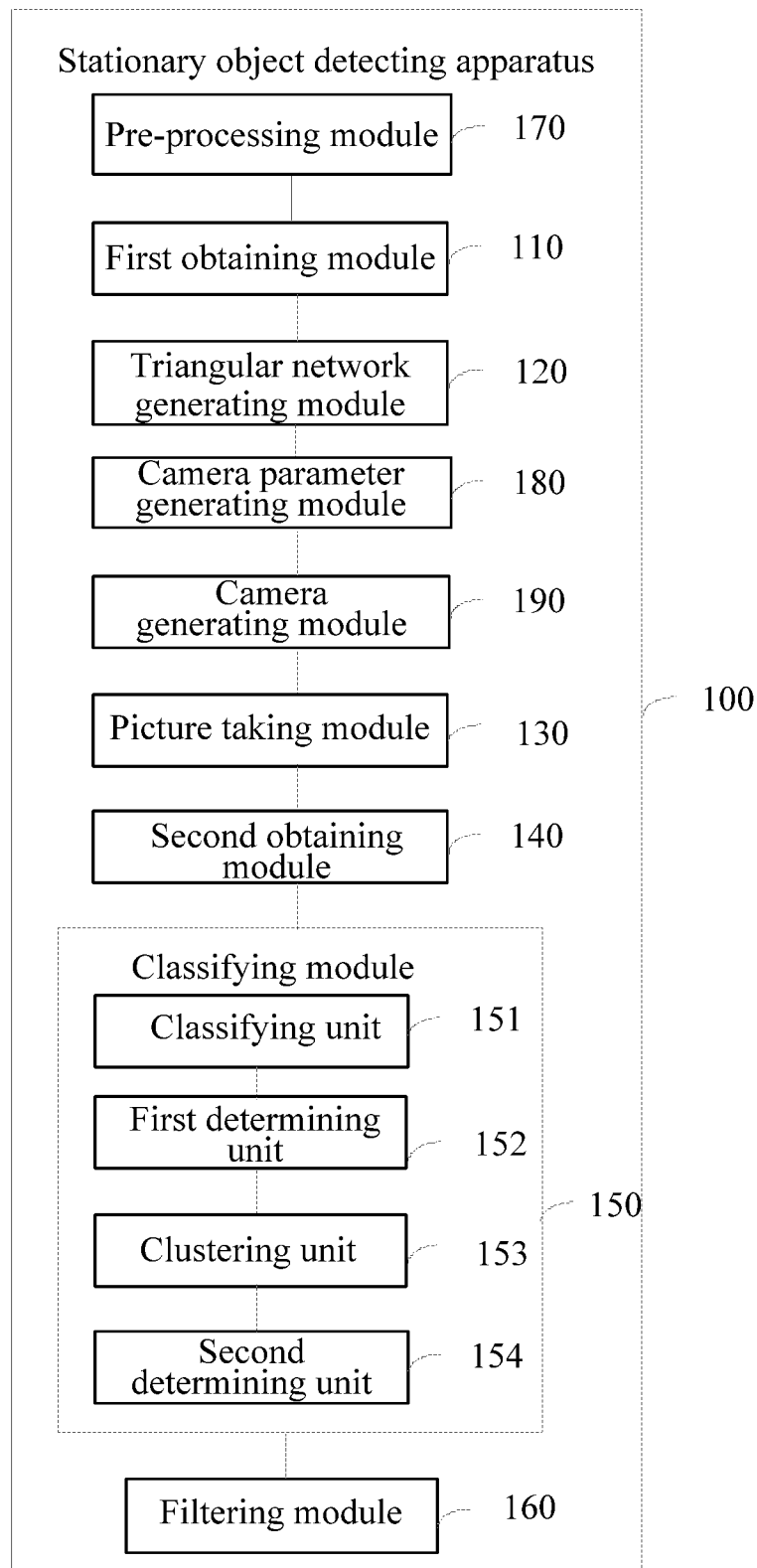
FIG. 10 is a schematic structure diagram of a stationary object detecting apparatus according to Embodiment 5 of the present disclosure.

FIG. 10 is a schematic structural diagram of a stationary object detecting apparatus according to Embodiment 5 of the present disclosure. On the basis of the foregoing embodiment, as shown in FIG. 10, the apparatus includes:

a camera parameter generating module 180, configured to generate a camera parameter according to a preset constraint, where the constraint includes: a pitch angle of a camera is greater than or equal to a preset angle, and a proportion of effective pixels in a generated image is higher than a preset value;

a camera generating module 190, configured to generate the preset camera according to the camera parameter.

In one possible implementation of the embodiment, the feature information includes an optimal domain, and the first obtaining module 110 is specifically configured to: for each data point, obtain all domains of the each data point, and a linear probability, a planar probability and a scattered probability of each of the domains; determine an amount of domain information of each of the domains according to the linear probability, the planar probability, and the scattered probability of each of the domains; take a domain with a smallest amount of domain information as an optimal domain of the each data point, and take a linear probability, a planar probability and a scattered probability of the optimal domain as a linear probability, a planar probability and a scattered probability of the each data point, respectively.

The stationary object detecting apparatus in the embodiment of the present disclosure can be used to perform the technical solution of the method embodiment shown in the foregoing, where the implementation principles and the technical effects are similar to each other, and thus details are not described herein again.

Figure 11:
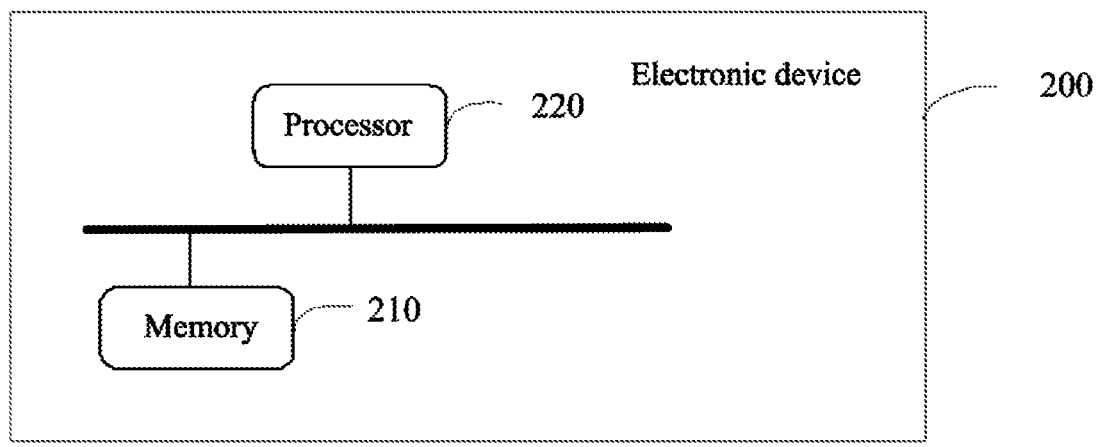
FIG. 11 is a schematic structure diagram of an electronic device according to an embodiment of the present disclosure.

FIG. 11 is a schematic structural diagram of an electronic device according to an embodiment of the present disclosure. As shown in FIG. 11, the electronic device 200 of the embodiment includes:

a memory 210, configured to store a computer program;

a processor 220, configured to execute the computer program to perform the foregoing stationary object detecting method, where the implementation principles and the technical effects are similar to each other, and thus details are not described herein again.

Further, when at least a part of the functions of the stationary object detecting method in the embodiments of the present disclosure are implemented by software, an embodiment of the present disclosure further provides a computer storage medium, where the computer storage medium is configured to store computer software instructions for detecting a stationary object as described above, when the instructions being executed on a computer, the computer is enabled to perform various possible stationary object detecting methods in the above method embodiments. When the computer execution instructions are loaded and executed on a computer, the processes or functions described in accordance with the embodiments of the present disclosure may be generated in whole or in part. The computer instructions may be stored in a computer storage medium or transmitted from one computer storage medium to another computer storage medium, which may be transmitted to another website site, computer, server or data center wirelessly (e.g., by means of cellular communication, infrared, short-range wireless, microwave, etc.). The computer storage medium may be any available medium that can be accessed by a computer, or may be a data storage device such as a server, a data center, or the like that includes one or more available media. The available medium may be a magnetic medium (e.g., a floppy disk, a hard disk, a magnetic tape), an optical medium (e.g., a DVD), or a semiconductor medium (e.g., an SSD) or the like.

At last, it should be noted that the above embodiments are merely illustrative of the technical solutions of the present disclosure, and are not intended to be limiting; although the present disclosure has been described in detail with reference to the foregoing embodiments, those skilled in the art should understand that the technical solutions described in the foregoing embodiments may be modified, or that some or all of the technical features may be replaced with other equivalents; and the modifications or replacements do not deviate the nature of corresponding technical solutions from the scope of the technical solutions of the embodiments of the present disclosure.

What is claimed is:

1. A stationary object detecting method, comprising:
obtaining point cloud data of a scene, wherein a background, a moving ground object in a moving state and a stationary object temporarily in a stationary state are comprised in the scene, and the stationary object comprises a vehicle in the stationary state;
performing a pre-processing on the point cloud data to remove the moving ground object in the scene and generate evenly distributed point cloud data that comprises data corresponding to the background and the stationary object;

obtaining feature information of each of data points in the pre-processed point cloud data;

performing a triangulation network connection on the data points in the pre-processed point cloud data to generate a triangular network model, and taking a picture of the triangular network model using a preset camera to obtain an image, wherein each pixel point in the image corresponds to one of a plurality of triangles in the triangular network model;

obtaining a first data point corresponding to each pixel point in the image, and obtaining a feature map of the pre-processed point cloud data according to feature information of each first data point, wherein the first data point is a data point on a vertex of the triangle corresponding to the pixel point; and inputting the feature map into a classification model to obtain data points corresponding to the stationary object in the pre-processed point cloud data;

wherein the inputting the feature map into the classification model to obtain the data points corresponding to the stationary object in the pre-processed point cloud data comprises:

inputting the feature map into the classification model to obtain a category of each pixel point in the image, wherein the category comprises a background or stationary object;

determining, according to the category of each pixel point, whether a category of a data point corresponding to each pixel point is a background or stationary object;

clustering each of the data points in the pre-processed point cloud data according to categories of the data points and a distance between each two of the data points to obtain at least one data cluster; and determining the data points corresponding to the stationary object according to a shape of each data cluster and a number of data points comprised in each data cluster.

2. The method according to claim 1, wherein the feature information of the data points comprises at least one of intensity information, a planar probability, a scattered probability, depth information, an optimal domain, and a vertical component of a normal vector of the optimal domain of the data points.

3. The method according to claim 2, wherein the feature map comprises a first feature map and a second feature map, and the obtaining a feature map of the pre-processed point cloud data according to feature information of each first data point comprises:

generating the first feature map of the pre-processed point cloud data according to intensity information, a planar probability, and a scattered probability of each first data point;

generating the second feature map of the pre-processed point cloud data according to an optimal domain, depth information, and a vertical component of a normal vector of the optimal domain of each first data point; and the inputting the feature map into a classification model to obtain data points corresponding to the stationary object in the pre-processed point cloud data comprises:

inputting the first feature map and the second feature map into the classification model to obtain the stationary object in the pre-processed point cloud data.

4. The method according to claim 1, wherein the classification model is a SnapNet classification model, wherein the SnapNet classification model is a two-class network model for distinguishing between a background and a stationary object.

5. The method according to claim 1, wherein after the determining the data points corresponding to the stationary object according to a shape of each data cluster and a number of data points comprised in each data cluster, the method further comprises:

performing an oriented bounding box filtering on the data points corresponding to the stationary object to enclose the data points corresponding to the stationary object in the oriented bounding box.

6. The method according to claim 1, wherein before the taking a picture of the triangular network model using a preset camera, the method further comprises:

generating a camera parameter according to a preset constraint, wherein the constraint comprises that: a pitch angle of a camera is greater than or equal to a preset angle, and a proportion of effective pixels in a generated image is higher than a preset value; and generating the preset camera according to the camera parameter.

7. The method according to claim 2, wherein the feature information comprises the optimal domain, and the obtaining feature information of each of data points in the pre-processed point cloud data comprises:

for each data point, obtaining all domains of the each data point, and a linear probability, a planar probability and a scattered probability of each of the domains;

determining an amount of domain information of each of the domains according to the linear probability, the planar probability, and the scattered probability of each of the domains; and taking a domain with a smallest amount of domain information as the optimal domain of the each data point, and taking a linear probability, a planar probability and a scattered probability of the optimal domain as the linear probability, the planar probability and the scattered probability of the each data point, respectively.

8. A stationary object detecting apparatus, comprising a memory and a processor, wherein the memory is configured to store a computer program; and the processor, when executing the computer program, is configured to:

obtain point cloud data of a scene, wherein a background, a moving ground object in a moving state and a stationary object temporarily in a stationary state are comprised in the scene, and the stationary object comprises a vehicle in the stationary state;

perform a pre-processing on the point cloud data to remove the moving ground object in the scene and generate evenly distributed point cloud data that comprises data corresponding to the background and the stationary object;

obtain feature information of each of data points in the pre-processed point cloud data establish a triangular network model based on the data points in the pre-processed point cloud data;

take a picture of the triangular network model using a preset camera to obtain an image, wherein each pixel point in the image corresponds to a triangle in the triangular network model;

obtain a first data point corresponding to each pixel point in the image, and obtain a feature map of the pre-processed point cloud data according to feature information of each first data point, wherein the first data point is a data point on a vertex of a triangle corresponding to each pixel point;

input the feature map into a classification model to obtain a category of each pixel point in the image, wherein the category comprises a background or stationary object;

determine, according to the category of each pixel point, whether a category of a data point corresponding to each pixel point is a background or stationary object;

cluster each of the data points in the pre-processed point cloud data according to categories of the data points and a distance between each two of the data points to obtain at least one data cluster;

determine the data points corresponding to the stationary object according to a shape of each data cluster and a number of data points comprised in each data cluster.

9. The apparatus according to claim 8, wherein the feature information of the data points comprises at least one of intensity information a planar probability, a scattered probability, depth information, an optimal domain, and a vertical component of a normal vector of the optimal domain of the data points.

10. The apparatus according to claim 9, wherein the feature map comprises a first feature map and a second feature map, and the processor is configured to:

generate the first feature map of the pre-processed point cloud data according to intensity information, a planar probability, and a scattered probability of each first data point; and generate the second feature map of the pre-processed point cloud data according to an optimal domain, depth information, and a vertical component of a normal vector of the optimal domain of each first data point; and input the first feature map and the second feature map into the classification model to obtain the stationary object in the pre-processed point cloud data.

11. The apparatus according to claim 8, wherein, the processor is configured to input the feature map into a SnapNet classification model to obtain a category of each pixel point in the image, wherein the SnapNet classification model is a two-class network model for distinguishing between a background and a stationary object.

12. The apparatus according to claim 8, wherein the processor is further configured to:

perform an oriented bounding box filtering on the data points corresponding to the stationary object to enclose the data points corresponding to the stationary object in the oriented bounding box.

13. The apparatus according to claim 8, wherein the processor is further configured to:

generate a camera parameter according to a preset constraint, wherein the constraint comprises that: a pitch angle of a camera is greater than or equal to a preset angle, and a proportion of effective pixels in a generated image is higher than a preset value; and generate the preset camera according to the camera parameter.

14. The apparatus according to claim 9, wherein the feature information comprises an optimal domain, and the processor is configured to: for each data point, obtain all domains of the each data point, and a linear probability, a planar probability and a scattered probability of each of the domains; determine an amount of domain information of each of the domains according to the linear probability, the planar probability, and the scattered probability of each of the domains; take a domain with a smallest amount of domain information as the optimal domain of the each data point, and take a linear probability, a planar probability and a scattered probability of the optimal domain as the linear probability, the planar probability and the scattered probability of the each data point, respectively.

15. A non-volatile computer storage medium, wherein the storage medium stores a computer program, wherein the computer program, when being executed, implements the following:

obtaining point cloud data of a scene, wherein a background, a moving ground object in a moving state and a stationary object temporarily in a stationary state are comprised in the scene, and the stationary object comprises a vehicle in the stationary state;

performing a pre-processing on the point cloud data to remove the moving ground object in the scene and generate evenly distributed point cloud data that comprises data corresponding to the background and the stationary object;

obtaining feature information of each of data points in the pre-processed point cloud data;

establishing a triangular network model based on the data points in the pre-processed point cloud data, and taking a picture of the triangular network model using a preset camera to obtain an image, wherein each pixel point in the image corresponds to a triangle in the triangular network model;

obtaining a first data point corresponding to each pixel point in the image, and obtaining a feature map of the pre-processed point cloud data according to feature information of each first data point, wherein the first data point is a data point on a vertex of a triangle corresponding to each pixel point; and inputting the feature map into a classification model to obtain data points corresponding to the stationary object in the pre-processed point cloud data;

wherein the inputting the feature map into a classification model to obtain data points corresponding to the stationary object in the pre-processed point cloud data comprises:

inputting the feature map into the classification model to obtain a category of each pixel point in the image, wherein the category comprises a background or stationary object;

determining, according to the category of each pixel point, whether a category of a data point corresponding to each pixel point is a background or stationary object;

clustering each of the data points in the pre-processed point cloud data according to categories of the data points and a distance between each two of the data points to obtain at least one data cluster; and determining the data points corresponding to the stationary object according to a shape of each data cluster and a number of data points comprised in each data cluster.

16. The non-volatile computer storage medium according to claim 15, wherein the feature information of the data points comprises at least one of intensity information, a planar probability, a scattered probability, depth information, an optimal domain, and a vertical component of a normal vector of the optimal domain of the data points.

* * * * *